April 7, 1942.  A. M. JACKSON  2,279,167

ROTARY SEAL

Filed Sept. 30, 1940  3 Sheets-Sheet 1

INVENTOR.
ARTHUR M. JACKSON
BY
ATTORNEY.

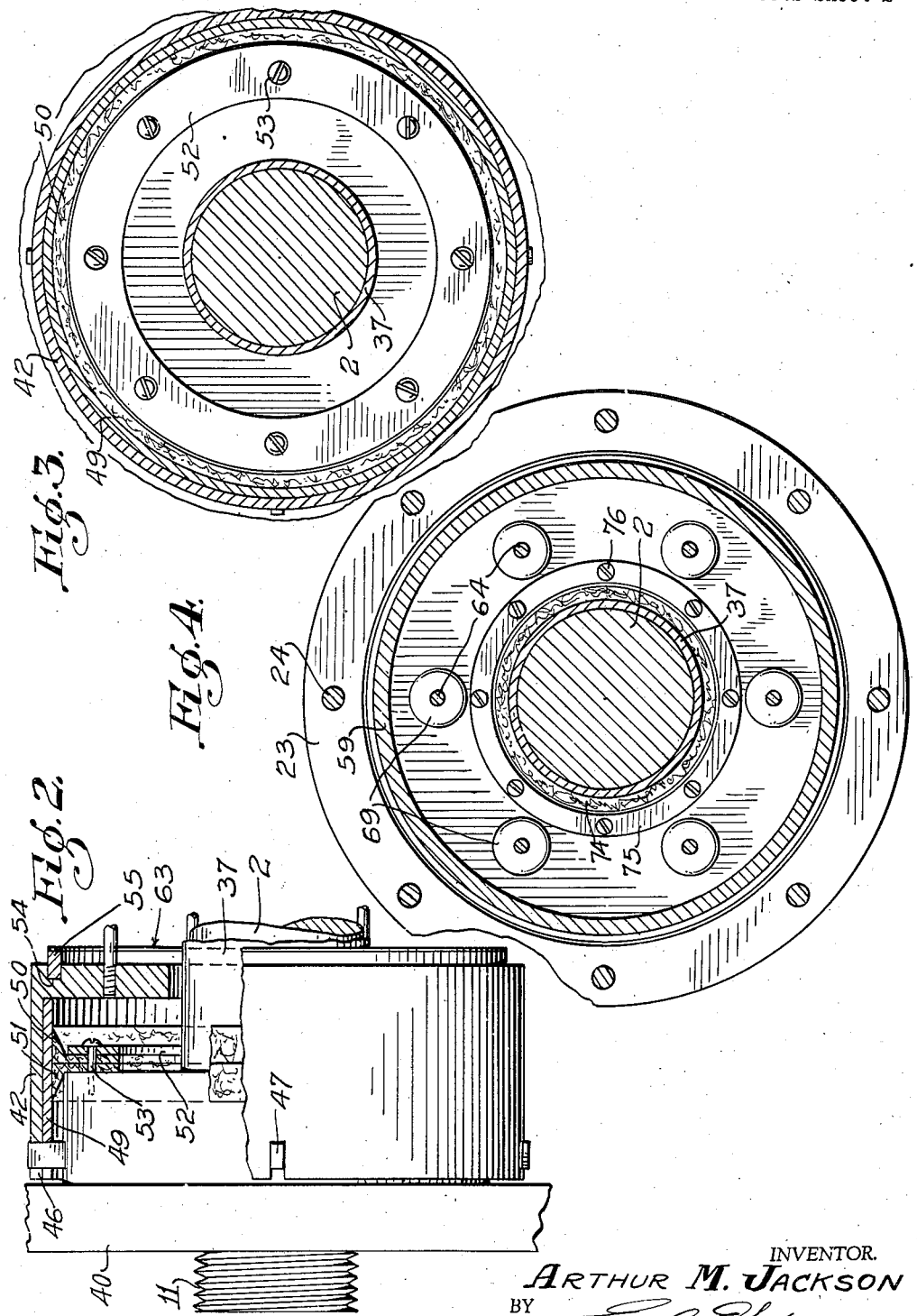

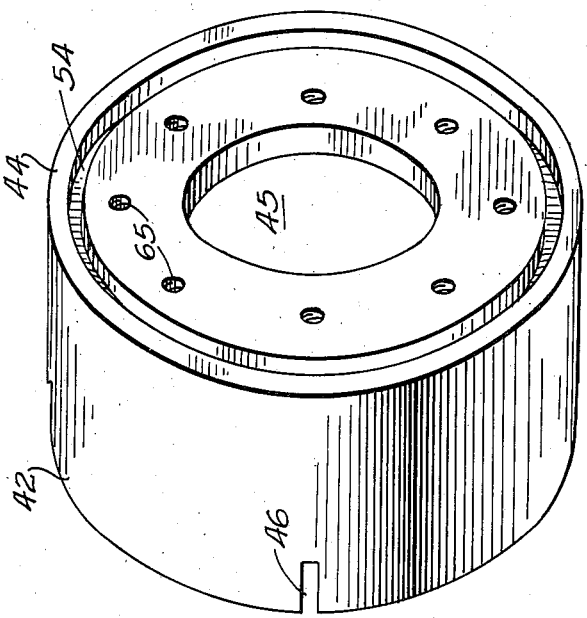
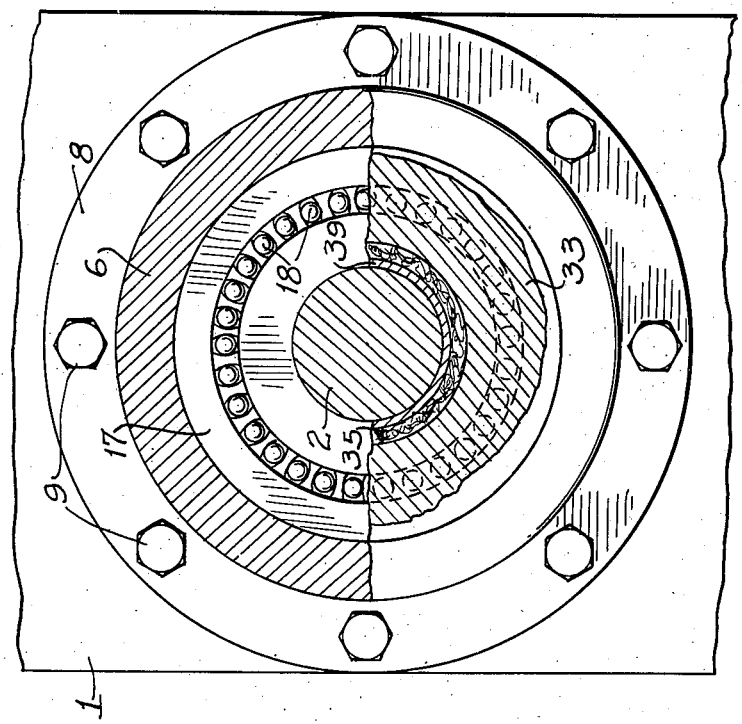

Patented Apr. 7, 1942

2,279,167

UNITED STATES PATENT OFFICE 2,279,167

ROTARY SEAL

Arthur M. Jackson, Los Angeles, Calif.

Application September 30, 1940, Serial No. 359,046

3 Claims. (Cl. 286—7)

This invention relates to a new, improved and complete propeller shaft assembly and the like for power driven ships, or any kind of device wherein a very compact self-adjusting rotary liquid seal for shafts is desired. It is, by this invention, permissible to place the seal on the outer end of the propeller shaft housing close to the propeller hub of the ship. By sealing the rear end of the shaft housing outside of the bearings, it makes possible the use of anti-friction roller or ball bearings designed for axial thrust and radial load. An important characteristic of this invention is the design of the housing, shaft, bearings and seal to transmit the entire thrust of the propeller to the housing. This invention makes it possible to use flexible couplings in the shaft between power plant and the propeller shaft, thus taking care of any misalinement of the shaft.

One of the principal objects of this invention is to provide a shaft sealer to separate two fluids, the sealer being constructed so that it can readily be assembled and disassembled.

Another object is to present a simply constructed sealer for power shafts which is capable of preventing liquid entering an air chamber.

A further object is to provide a sealing unit and propeller shaft for ships which is capable of long service and efficient operation, and which is simple in construction and economical to manufacture.

Other objects, advantages and features of my invention will appear from the accompanying drawings, the subjoined detailed description, the preamble of these specifications and the appended claims.

Applicant is about to illustrate and describe one of the forms of his invention in order to teach one how to make, use and vend the same, but it is to be understood that the drawings and description thereof are not to limit the invention in any sense whatsoever, except as limited by the appended claims.

In the drawings:

Fig. 2 is an elevational view of a portion of the invention, parts being broken away to show inner parts.

Fig. 3 is a broken portion of the invention, partly in elevation and partly in section, taken substantially along the line 3—3 of Fig. 1.

Fig. 4 is a sectional part taken substantially along the line 4—4 of Fig. 1.

Fig. 5 is a view taken substantially along the line 5—5 of Fig. 1.

Fig. 6 is a perspective view of a portion of the invention.

Figure 1:
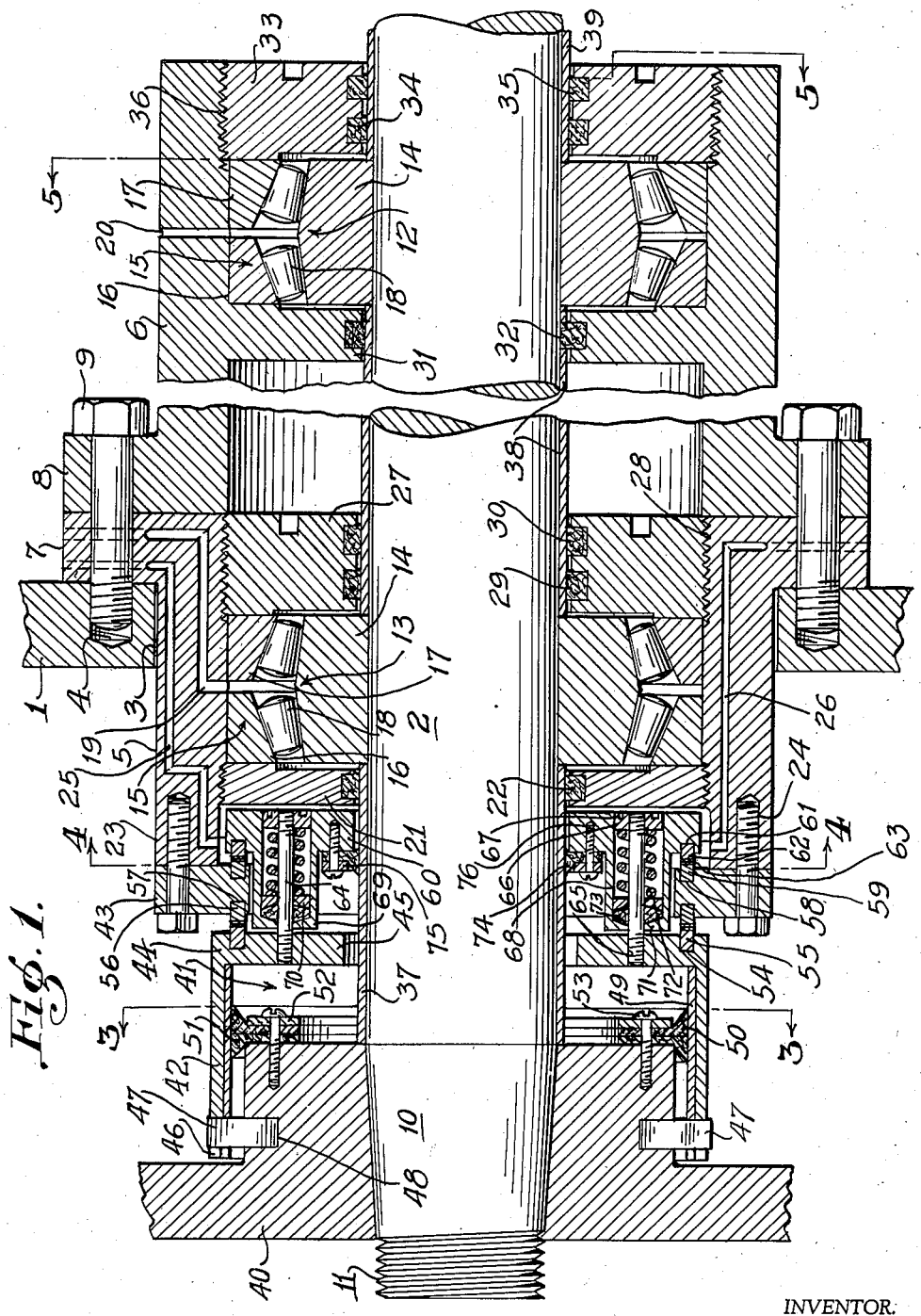
Fig. 1 shows the invention in longitudinal section.

The reference character 1 indicates the stern post of a ship which is adequately braced with respect to the hull of the ship to withstand all stresses due to the operation of the propeller shaft 2. The post has a circular opening 3 with a plurality of threaded bores 4 about its margin to accommodate and give support to the two housing shells 5 and 6. The housing shells have abutting circular flanges 7 and 8 which are held securely together and to the stern post 1 by a plurality of bolts 9, the bolts 9 being threadably engaged in the bores 4. Suitable gaskets may be employed between the abutting surfaces of the post and flanges to make a hermetically sealed fit.

The shaft 2 has the tapered portion 10, and threaded end 11 for receiving lock nuts and washers. The other end is shown as broken off, but leads to a flexible couple, not shown, where connection is made with the power shaft from the engine room of the ship.

Two main roller bearings support the propeller shaft, an aft bearing 13 and a forward bearing 12. Each bearing has pyramidal surfaced journal block 14 spaced from a cage block 15 providing the two raceways 16 and 17 for accommodating in the usual manner the plurality of conically shaped rollers 18, as shown. The aft bearing assembly snugly fits the bore of the housing shell 5 and is provided with grease ducts 19, and the forward bearing assembly snugly fits the bore of the housing shell 6 which is also provided with a grease duct as indicated by 20.

The shell 5 has a cross partition 21 with a central bore slightly spaced from the shaft, the end having an annular groove to accommodate a felt sealing ring 22 to prevent lubricant escaping from the housing shell along the shaft. This end of the shell 5 has an annular embossed portion 23 with a plurality of threaded bores 24. The top of the shell 5 has the oil duct 25, and the bottom of the shell has the drain duct 26 to enable pressure oil to be fed through a chamber not yet described. The bearing 14 is held in place by the bearing ring 27 which threadedly engages the bore of shell 5 at 28. Felt rings 29 and 30 prevent escape of lubricant along the shaft 2.

The housing shell 6 has a cross portion, indicated at 31, and which has a central bore spaced from the shaft and provided with a felt ring 32. The forward end of the shell 6 has a bearing ring 33 and felt rings 34 and 35 which are the same as elements 27, 29 and 30; the ring 33 is also threadedly connected with the shell bore as indicated at 36.

A sleeve 37 maintains spaced relation between the aft bearing 13 and the hub 40 of the propeller; another sleeve 38 maintains spaced relation between aft bearing and forward bearing 12; and another spacer sleeve 39 is provided between the forward bearing and the flexible coupling, not shown.

Between the hub 40 and partition 21 is a chamber 41 formed by the circular cup 42, annular ring 43, walls 21, 23 and the hub 40. The cup 42 has an annular side wall 44 and an integral cross wall 45, the cross wall having a central opening to accommodate the shaft 2 and sleeve 37. The aft end of cup wall 44 has upper and lower three or four holes 46 which snugly receive metal pegs 47 which are shrunk into alined bores 48 as shown. The purpose of these pins is to cause the cup to rotate with the propeller of the ship.

On the inner surface of the wall 44 is a liner ring 49 of bronze which has liquid sealed contact with annular and angular resilient elements 50 and 51 which may be rubber or leather. The wider flange of these elements abut and are held in abutment with each other and the inner surface of the hub 40 by the annular band 52 which is forced against the hub by a plurality of bolts 53.

On the forward face of the cross wall 45 of the cup is an annular groove 54 into which is shrunk an annular metallic sealing ring 55. A similar annular ring 56 is shrunk into an annular groove 57 in one face of the ring 43 and in the other face of the ring 43 is an annular groove 58 into which has been shrunk the annular ring 59.

Adjacent the aft side of wall 21, but spaced slightly therefrom, is an annular partition 60 having a central opening to accommodate the shaft 2 and sleeve 37. Along the outer margin of this partition is the annular groove 61 having shrunk therein the annular metallic ring 62, the face of which is carefully machined to make a perfect liquid sealing fit with the machined face of its adjacent ring 59. Likewise, the adjacent faces of the rings 55 and 56 are carefully machined and make liquid sealing abutment. Although any satisfactory hardened steel may be used as the material for the rings 55, 56, 59 and 62 so as to give long efficient service, it is preferred to provide the frictional faces of these rings with a coating of "Stellite" which is an exceedingly hard metal and when carefully applied and machined, it will give very long efficient service. Such a material, or equivalent, is indicated at 63.

The partition 60 is supported by a plurality of studs 64 which have threads on both ends, one end of which are screwed in their respective threaded bores 65 in the wall 45 of the cup. The other ends of the studs each carry a lock nut 66 which have spaced apart holes 67 on their outer sides to receive a proper tool to turn them. The lock nuts are not threadedly meshed with the bores 68 of projecting housings 69, as shown. These housings 69 surround the shaft and in cooperation with the studs 64, are the only support for the partition 60.

Within each housing 69, surrounding the stud 64, is a movable washer 70 which is urged toward the end wall 71 of the housing by a coiled spring 72. Between the washer and end wall is sealing material 73 to prevent passage of liquid along the stud 64. The central opening of the partition is sealed from the chamber 41 by an annular resilient element 74 which has one surface in contact with the sleeve 37 and another surface in abutment with a side surface of the partition 60. Annular band 75 and bolts 76 hold the element 74 in place as shown. By this construction, the cup 42 and partition 60, along with their associated parts, rotate with the shaft 2 and propeller hub 40 and make sliding contact with the balance of the device through the extremely hard surfaces 63 on the rings 55—56 and 59—62.

It can readily be seen that the water pressure upon the exposed surfaces of the sealers 51 is substantially the same as upon the exposed side surfaces of the metal sealing rings 55 and 56, thus avoiding unbalanced water pressures upon the cup which would tighten or loosen the frictional contact between the rings 55 and 56. If this balance were not maintained, the adjustment on the compression springs 72 would have little effect. The nuts 66 must be adjusted along the studs 64 until there is sufficient surface pressure between the rings to assure a continued liquid seal. This construction forms a floating sealer with a minimum of friction.

Having thus described my invention, what is claimed as new and desired to be secured by Letters Patent is:

1. In a liquid seal for the propeller end of a shaft, a shaft, a fixed main housing enveloping a portion of the shaft, an annular flange depending from the housing toward the shaft and having opposite facing sides, an annular groove in each of said sides, a stationary sealing ring in each of the grooves having faces protruding in opposite directions from the flange, a connecting cup having a perforated base receiving the shaft and having its open portion facing the near end of the shaft, a plurality of connecting studs along the rim of the cup extending toward the shaft and adapted to engage a portion of a propeller, a disc spaced from the base of the cup and having a perforation receiving the shaft, resilient means connecting the disc with the cup and which urges the disc toward the cup, an annular groove in said disc and said cup base, a rotary sealing ring in each groove, all of the said sealing rings having equal radii with respect to the shaft so that the faces of the rotary rings slide along the faces of the stationary rings.

2. The liquid seal recited in claim 1 wherein the resilient means connecting the disc with the cup includes a plurality of circular spaced apart housings fixed to the disc and a plurality of spaced apart studs fixed to the cup base and extending into the circular housings, a cap at the end of each circular housing and fixed to one end of its respective stud, and a coil spring intermediate each cap and bottom of its respective housing for the purposes described.

3. In a liquid sealing unit for propeller shafts, a housing and a shaft, a cup having an annular peripheral flange with a perforated base to receive the shaft, stud means extending into the cup adapted to engage a portion of the propeller, a disc spaced from the base of the cup having a perforation to receive the shaft, resilient means between the cup base and disc for drawing them toward each other, an annular flange fixed to the housing and extending toward the shaft, said ring having two faces, one facing the disc and the other the cup, a bearing ring extending from each face of the flange, and a bearing ring extending from the cup base and disc and engaging the rings of the flange for the purposes described.

ARTHUR M. JACKSON.